United States Patent [19]
Clegg

[11] 3,936,960
[45] Feb. 10, 1976

[54] METHOD AND APPARATUS FOR ROOTED PLANT EXCAVATING AND PLANT PACKAGE PRODUCED THEREBY

[76] Inventor: Samuel E. Clegg, P.O. Box 252, Plainfield, Ill. 60544

[22] Filed: June 10, 1974

[21] Appl. No.: 477,854

[52] U.S. Cl.............................. 37/2 R; 37/195; 47/37
[51] Int. Cl.² .......................................... A01G 23/04
[58] Field of Search ....... 37/2 R, 2 P, 195, DIG. 18; 47/37

[56] References Cited
UNITED STATES PATENTS

| | | | |
|---|---|---|---|
| 2,863,258 | 12/1958 | Gish | 37/2 R |
| 2,964,860 | 12/1960 | Daniels, Jr. | 37/2 R |
| 2,986,294 | 5/1961 | Granryd | 37/DIG. 18 |
| 3,284,932 | 11/1966 | Wendlandt | 37/2 R |
| 3,364,601 | 1/1968 | Korenek | 37/2 R |
| 3,471,192 | 10/1969 | Childs et al. | 37/2 R X |
| 3,512,276 | 5/1970 | Juhl | 37/2 R |
| 3,618,234 | 11/1971 | Bates | 37/2 R |
| 3,623,245 | 11/1971 | Adams | 37/2 R |
| 3,713,234 | 1/1973 | Grover et al. | 37/2 R |

Primary Examiner—Clifford D. Crowder

[57] ABSTRACT

A rooted plant with a ball may be excavated from the surrounding soil by means of an apparatus the form of which comprises a plurality of spades cooperatively associated so as to independently pierce the earth about the plant forming a hollow enclosure for a generally frusto-conical ball of earth. After the earth has been pierced and enclosed a separate undercutting element is swung beneath the enclosure generating a somewhat hemispherical bottom beneath the enclosed ball such that the apparatus, the plant and retained ball may be lifted from the surrounding soil and the plant and ball may be easily removed from the apparatus. The resulting ball may be wrapped to form a unique plant package.

13 Claims, 15 Drawing Figures

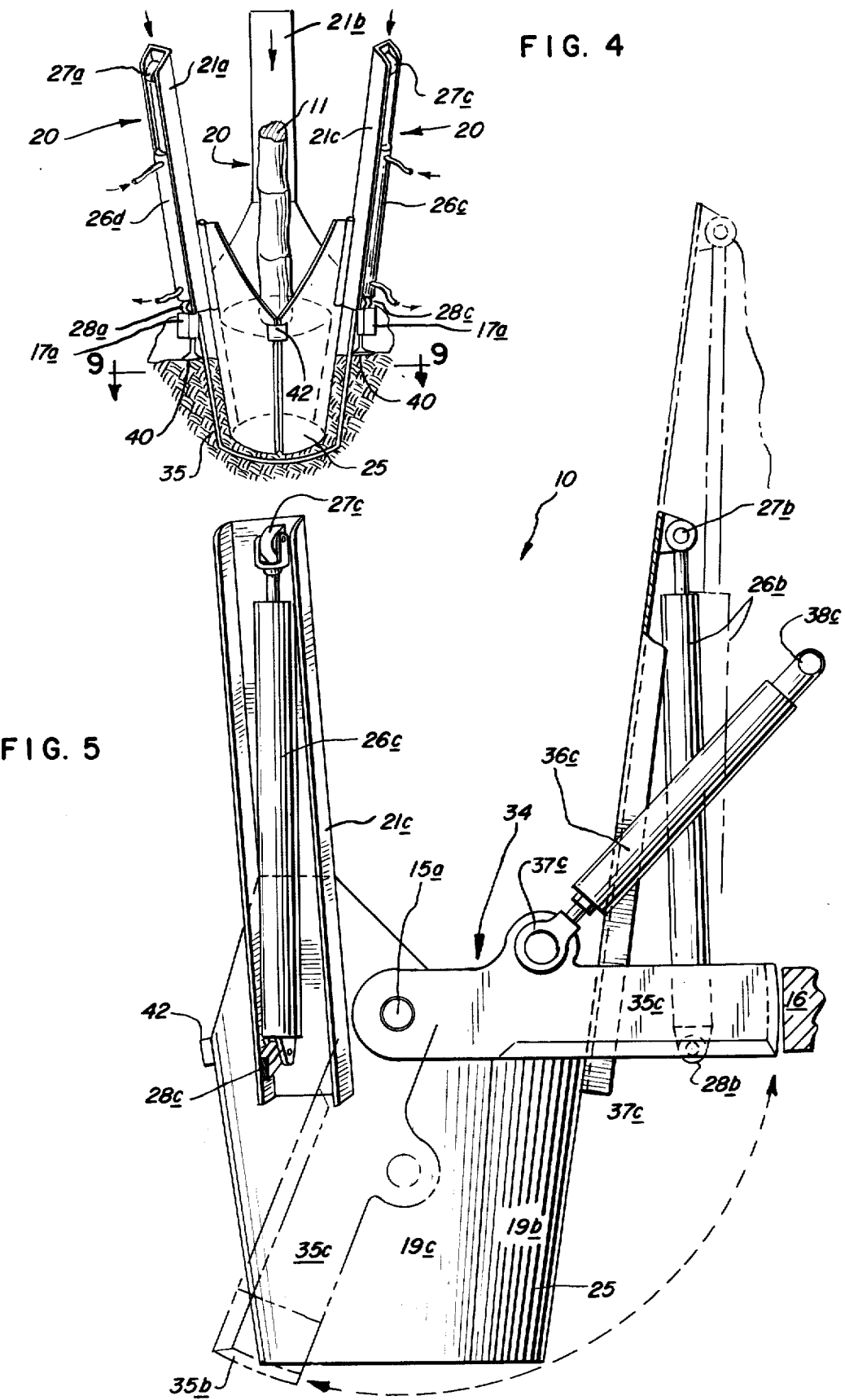

3,936,960

METHOD AND APPARATUS FOR ROOTED PLANT EXCAVATING AND PLANT PACKAGE PRODUCED THEREBY

BACKGROUND OF THE INVENTION

This invention relates to the excavation of rooted plants such as trees and shrubs, the excavation being undertaken in such a way that a well shaped protective ball of soil about the roots of the plant is maintained intact for protection of the plant during transplantation.

The apparatus is adapted for use in connection with a vehicle such as a tractor, truck or specialized vehicle like the Case Uniloader Model 1737, the vehicle functioning in cooperation to position the apparatus with respect to the plant to be excavated and to provide mobility and power for the apparatus. The apparatus is adapted first to surround the trunk or base of the rooted plant and pierce the soil thereabout and then to undercut the soil beneath the plant forming a generally frusto-conical ball of protective soil. In this way the plant may be removed from the surrounding soil with a substantial part of the roots thereof and protective soil intact. The apparatus is designed to excavate the rooted plant quickly and efficiently with a minimum of hand labor, and in the preferred form it removes a generally frusto-conical ball having a hemispherical bottom. The ball when wrapped with burlap or the like constitutes a unique plant package which optimizes root protection, ease of handling and ease of storage and replanting.

The invention features spades and spade supports of novel construction for piercing the earth and forming a retaining enclosure of generally frusto-conical shape about the roots of the plant, a novel structure for supporting and manipulating the enclosure, a novel bowed undercutting element for severing the ball from the earth beneath the enclosure and a novel plant package resulting therefrom.

SUMMARY OF THE INVENTION

In accordance with one embodiment of the invention an apparatus is provided comprising a U-shaped support connected to a vehicle for vertical movement relative to the earth and for supporting three spades equally spaced about the support for reciprocal movement into and out of the earth. The spades may be operated to pierce the earth independently of one another to minimize the amount of reaction force and power required. A simple locking arrangement is provided for holding the spades in a position forming a steep-sided, substantially frusto-conical enclosure and for sustaining the weight of the plant and ball during removal from the earth. The U-shaped support includes a bight connected to a pair of horizontally extending legs hinged at a point between the bight and their ends for horizontal arcuate movement of said ends. Mounting to the bight and each of the ends are substantially vertical guides for each of the three spades. The ends may be pivoted about a vertical axis away from one another thus moving the guides and spades associated with each from their earth piercing position to a C-shaped pattern for receiving the trunk or the base of the rooted plant prior to excavation, or in the alternative for removing the ball after excavation.

The soil excavating means consists of the described cooperating spades and an undercutting element which is mounted for swinging movement about a horizontal axis relative to the U-shaped support member to undercut the soil beneath the plant after the piercing has been accomplished but before the ball enclosure is lifted from the earth. There is preferably a pair of arms pivotally mounted on the U-shaped support at their one end and connected to opposite ends of a knife blade at their other end. The blade is bowed outwardly with respect to the pivot axis of the arms and is adapted to swing from a position juxtaposed to the bight downwardly and forwardly under the enclosure formed by the spades which have pierced the earth and thereby sever a ball with a substantially hemispherical convex bottom. If desired, the undercutting element knife blade may remain in its downward position to aid in the lifting and removal of the plant and ball.

DESCRIPTION OF THE DRAWINGS

FIG. 4 shows a front elevational view partly in section of the excavating spades inserted completely into the earth and forming a generally frusto-conical hollow enclosure, shown also is the latching means which hold the front spades together;

FIG. 5 is an enlarged side elevational view of the apparatus showing the spade mechanism and the undercutting blade, phantom lines are used to illustrate the alternate positions of both;

DESCRIPTION OF THE PREFERRED EMBODIMENT

Figure 1:
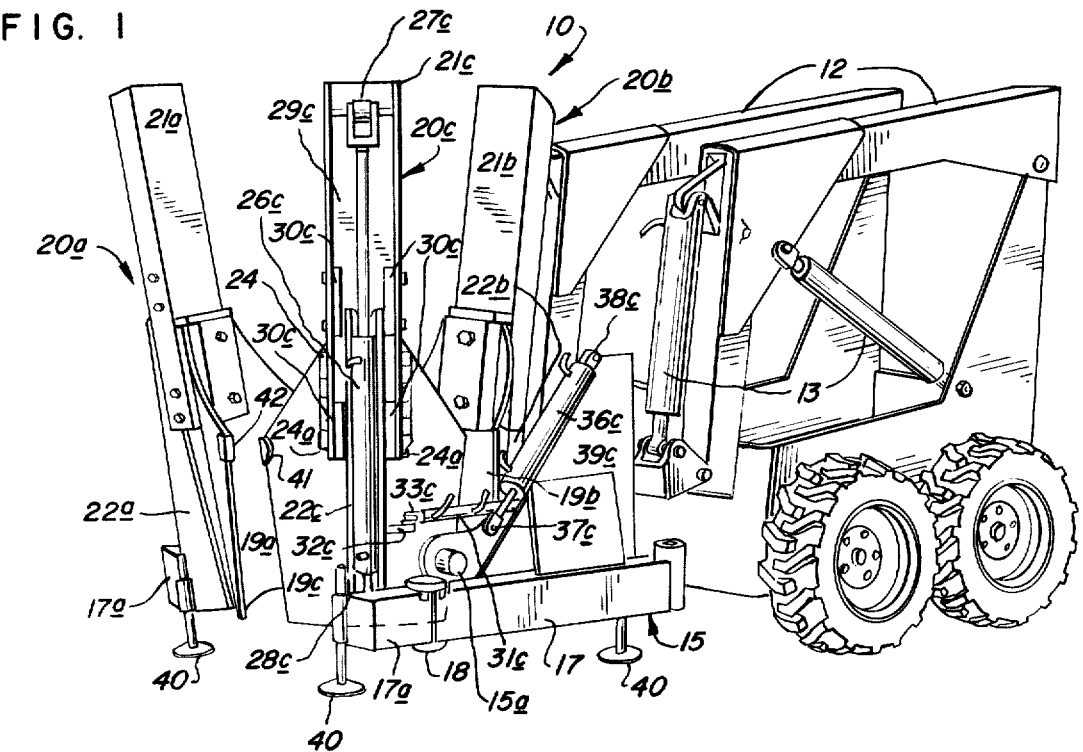
FIG. 1 is a side perspective elevational view of an excavating apparatus and vehicle wherein the spades of the apparatus are in a position slightly opened as also shown in FIG. 3.
Figure 2:
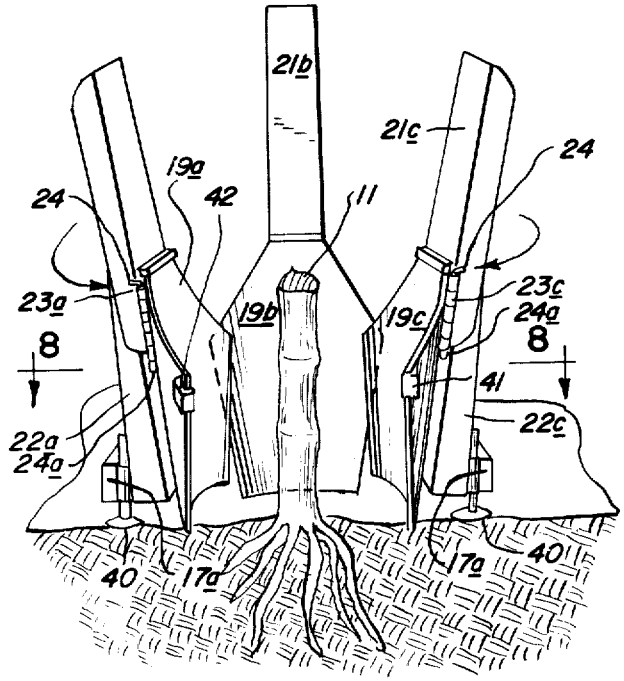
FIG. 2 is a front elevational view of the spades and their guides shown in a completely opened position for facilitating the positioning of the apparatus about the trunk or case of a rooted plant.

With reference to the drawings, more particularly to FIGS. 1 and 2, a plant excavator apparatus 10 is adapted to excavate a rooted plant 11 and associated ball from the surrounding soil. The apparatus 10 is shown attached by suitable linkage 12 to the front of a vehicle such as a rubber wheeled tractor or truck or specialized vehicle like a Case Uniloader Model 1737 the vehicle functioning in cooperation to position the apparatus 10 about the plant to be excavated and to provide mobility and power for the apparatus 10; whereby, hydraulic fluid under pressure is transmitted from a pump means connected to the engine for the vehicle, such that fluid transmission lines can be connected to the excavator apparatus 10. The excavating apparatus 10 may be raised and lowered and kept generally parallel to the ground by means of linkage 12 activated by power cylinders 13, see FIGS. 1 and 6 in a manner well-known in the hydraulic fork lift art.

Figure 8:
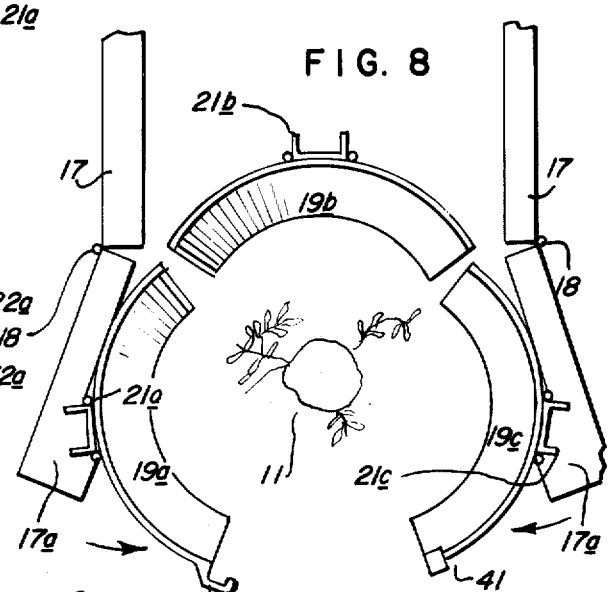
FIG. 8 is a sectional view of the spades in their open position and taken along lines 8—8 of FIG. 2.
Figure 9:
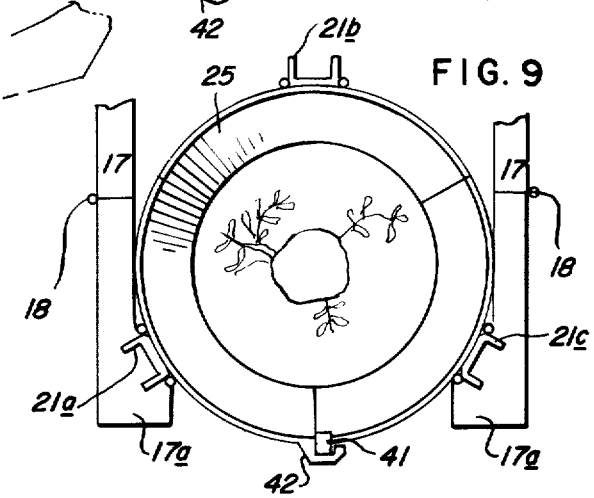
FIG. 9 is a sectional view of the spades in their closed or enclosure forming position taken along lines 9—9 of FIG. 4.
Figure 7:
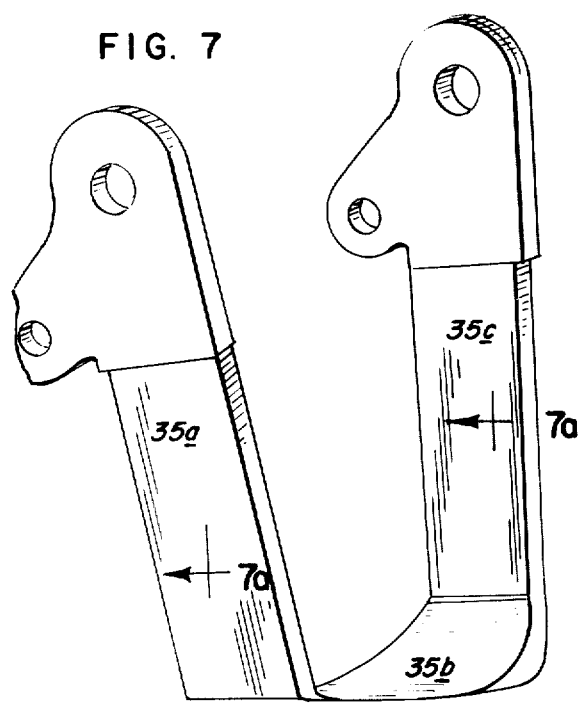
FIG. 7 is an enlarged perspective view of the undercutting blade.

The excavating apparatus 10 comprises a U-shaped support 15 having a bight portion 16 and a pair of horizontally extending legs 17 connected to opposite ends of the bight 16 at their end nearest the vehicle and having hinged connections 18 at points between the bight 16 and the most outwardly extended ends 17a of the leg 17. As shown in FIGS. 1, 8 and 9 the outwardly extending ends 17a are free to pivot in a horizontal plane outwardly with respect to the U-shaped support 15 but not inwardly as hinges 18 are positioned on the outer sides of legs 17.

Figure 3:
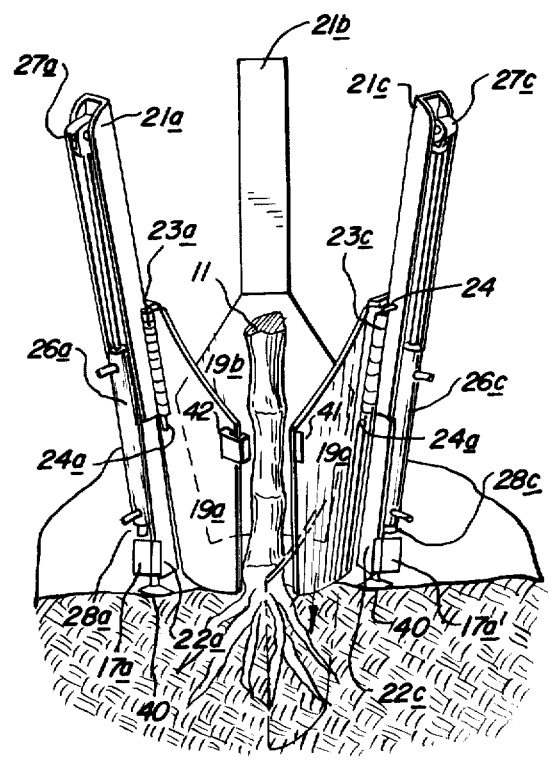
FIG. 3 is a front elevational view of the spades shown in FIG. 2 except however, here the spades are shown in the nearly closed position prior to forming a substantially frusto-conical hollow enclosure when the spades meet after piercing the earth as shown in phantom for one of the spades.

As best shown in FIGS. 1, 2 and 3, the group of spades 19 are individually labeled 19a, b and c, and are supported upon U-shaped support 15 for independent reciprocal vertical movement by three power mechanisms 20 labeled (from the viewers left to right) 20a, b and c, respectively, and in particular, in FIG. 1, spade 19c with mechanism 20c is shown. Similar power mechanisms 20a and b are used in conjunction with spades 19a and b. The construction of spades 19a, b and c will be described in complete detail after the means by which they are mounted and moved is explained. Power mechanisms 20a, b and c include spade supports 21a, b and c, spade guides 22a, b and c, and releasable spade connections 23a, b and c. Spade supports 21a, b and c are channels having a U-shaped cross section arranged to ride upon similar but smaller channels or guides 22 a, b and c, respectively, for guiding the spades 19a, b and c. The spade connections 23a, b and c are similar to the connection for the components of a hinge in that there are a series of aligned eyes attached to each side of spade supports 21a, b and c which conjugate with similar aligned eyes mounted to the upper back sides of spades 19a, b and c, respectively. Suitable L-shaped rods 24 each having an elongated end 24a are inserted through the aligned conjugated eyes for attachment of each spade 19a, and c to their respective spade support 21a, b and c. Connections 23a, b and c are important because they allow the spades 19 to be quickly changed if circumstances warrant. For instance, if the spades are damaged or if the spades 19 are too small for the particular rooted plant, a new set of spades 19 having a larger size forming a larger hollow frusto-conical enclosure can easily be substituted. As will be explained the apparatus 10 can be adjusted to excavate plants with balls of diameters varying from 15 to 24 inches and having a height of 10 to 20 inches.

Various sized rooted plants can be accommodated by this apparatus 10 without need of costly or time consuming parts or procedures.

Spade guides 22a, b and c are welded to support 15 at an angle of 8° to 10° with respect to the vertical such that the open portion of each guide 22a, b and c face outwardly or away from the opening of U-shaped support 15, and the upper end of each guide 22 is inclined outwardly or away from the U formed by support 15, see FIGS. 1, 2, 3 and 4. The three guides 22a, b and c are positioned about the support 15 such that guide 22b is supported by bight 16 and the other two guides 22a and c are each supported by its respective leg end 17a. When ends 17a are in line with legs 17, as in FIGS. 1, 4 and 9, the plane defined by the inward faces of guides 22a, b and c intersect with one another and generally describe an inverted three-sided pyramid. Spade supports 21a, b and c ride on guides 22a, b and c respectively, for sliding movement.

The inclination of guides 22a, b and c and the shape of the spades 19a, b and c and the reciprocal movement of the spade supports 21a, b and c upon guides 22a, b and c causes the spades 19a, b and c to form a hollow generally frusto-conical enclosure 25, best shown in FIGS. 4 and 9. The movement of spades 19a, b and c being caused by hydraulic cylinders 26a, b and c respectively, shown in FIGS. 1, 3, 4 and 5. Cylinders 26a, b and c nestle within and parallel to the hollow of the U formed by guides 22a, b and c, and are of a standard well-known design and include upper and lower pivotal connections 27a, b and c and 28a, b and c respectively, the former connect to each spade supports 21a, b and c and the latter to U-shaped support 15. As shown in FIG. 5 in solid lines, cylinder 26c and blade 19c are in their lowermost positions; similarly, phantom lines depict the spade cylinder 26b at its uppermost position. The controls (not shown) for the hydraulic fluid for each of the cylinders 26a, b and c are arranged such that they may be activated independently of one another to move spades 19a, b and c along their respective guides 22a, b and c separately and independently.

Each spade 19a, b and c is heavy sheet metal formed with a latitudinally curved and slight taper. Prior to forming, the flat sheet from which the spade is made has an oppositely truncated diamond shape composed of two regular trapezoids wherein their equally sized larger bases abut one another. Each of the two portions formed by the abutting opposed trapezoids perform different functions. The top portion is smaller and acts to support and connect the spades 19a, b and c to the spade supports 21a, b and c while the bottom portion acts as the earth piercing element. By varying the amount of lateral curve and size of the truncated diamond a variety of different sized spades can be made which operate to produce different size balls having different diameters. Spades 19a, b and c are connected to their respective spade supports 21a, b and c, by eyes mounted on the back of each blade 19a, b and c.

Spades 19a, b and c are each forced into the earth by hydraulic cylinders 26a, b and c to form a hollow generally frusto-conical enclosure 25 having a slight taper from top to bottom resulting from the curved trapezoidal configuration of the lower portion of each spade 19, the inclination of the guides 22a, b and c on which spade supports 21a, b and c move.

To retain supports 21 on their respective guides 22 there are plates 29 and retaining blocks 30. The same arrangement is used on each of the power mechanisms 20 such that for any particular mechanism 20a, b or c there are corresponding retaining locks 30a, b or c, or plates 29a, b or c. In FIG. 1 the back of plate 29c is shown captured by retaining blocks 30c bolted to the inside walls of support 21c. Plate 29c is attached to the front face of guide 22c and extends to the inside edges of the front wall of support 21c. Plate 29c is captured within the confines of guide 22c, blocks 30c, and support 21c such that it can move up and down along guide 22c. Similarly, power mechanisms 20a and b include corresponding components 29a and b and 30a and b which cooperate in the same way.

Figure 6:
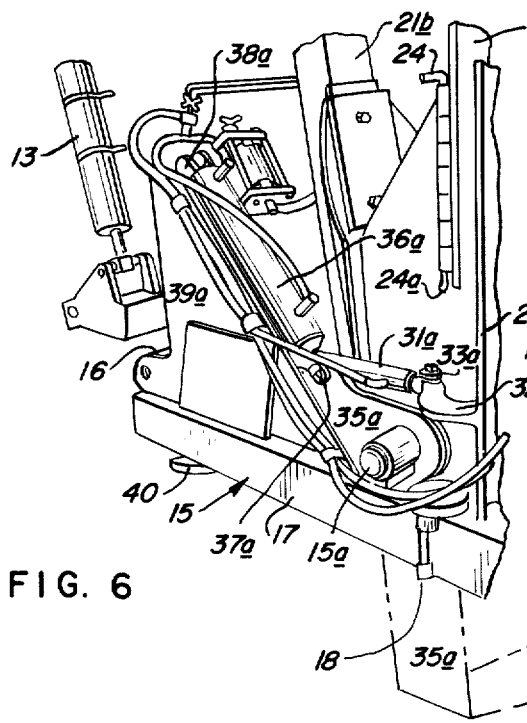
FIG. 6 is a partial perspective view of the side of the apparatus and in particular the U-shaped support and the mounting of the hydraulic power cylinders.

FIGS. 2 and 8 illustrate how the spades 19a and b are moved apart when ends 17a pivot with respect to legs 17 about vertical hinge 18. FIG. 6 shows hydraulic cylinder 31a mounted parallel and above leg 17 of support 15 and similarly FIG. 1 shows hydraulic cylinder 31c mounted above leg 17 on the opposite side of support 15. Cylinders 31a and c operate to rotate legs 17a and spades 19a and c, respectively, from a closed position shown in FIG. 3 to an open position shown in FIG. 2. For this purpose curved arms 32a and c are provided on guide channels 22a and c, respectively, see FIGS. 1 and 6. To eliminate any binding between hydraulic cylinders 31a and c and curved arms 32a and c, pivotal connections 33a and c are provided between the arms 32a and c and the cylinders 31a and c. The cylinders 31a and c are controlled in a well-known manner such that the spades 19a and c are moved or pivoted about hinges 18 in a uniform manner.

Figure 7A:
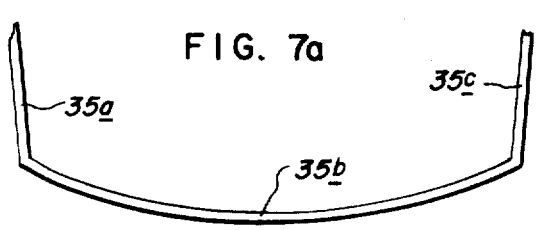
FIG. 7a is a partial sectional view taken along lines 7a—7a of FIG. 7.

The undercutting mechanism 34 shown in FIG. 5 severs the rooted plant 11 and associated ball from the ground immediately therebeneath. Mechanism 34 includes a cutter 35 and power cylinders 36a and c. Cutter 35 has a pair of arms 35a and c, pivotally connected at their top ends to the U-shaped support 15 near and slightly above and rearwardly of hinges 18, such that they rotate about an axis 15a as shown in FIGS. 1, 5, 6 and 7 upon pins and bearings. Arms 35a and c are joined by a bowed blade 35b, see FIGS. 7, and 7a. The cutter element 35 is arranged to move from a position with blade 35b juxtaposed to bight 16 to a position where blade 35b is below hollow frusto-conical enclosure 25, see FIG. 5, wherein the cutter element 35 is shown in both positions and a phantom arc has been added to illustrate the path of the knife blade 35b. In order to facilitate the movement of cutter 35 through the earth the leading edge is beveled and when viewed from a point on what would be the axis 15a of the pivot for arms 35a and c, the blade 35b is V-shaped forwardly to act as a plow thus easing the cutting, see FIGS. 6 and 7. Hydraulic cylinders 36a and c, FIGS. 1, 5 and 6, are connected by clevises 37a and c, respectively, for moving the cutter element 35 as described. There is a slight offset between the axis of the clevis connections 37a and c and the axis 15a of the pivot connections for cutter arms 35a and c such that a moment arm is provided between the clevis connections 37a and c of cylinders 36a and c and cutter 35. Again, cylinders 36a and c are supported on U-shaped support 15 by means of pivotal connections 38a and c, respectively, on a pair of upstanding gussets 39a and c located near the connections of legs 17 with bight 16. Cylinders 36a and c are controlled in a well-known manner such that cutter 35 is moved forcefully from its juxtaposed position for undercutting. More specifically, a flow dividing circuit provides more fluid at greater pressure to the cylinder either 36a or 36c which has the greater load so that cutter 35 moves without cocking or stalling because of rocks, stones or inclusions in the earth.

Figure 14:
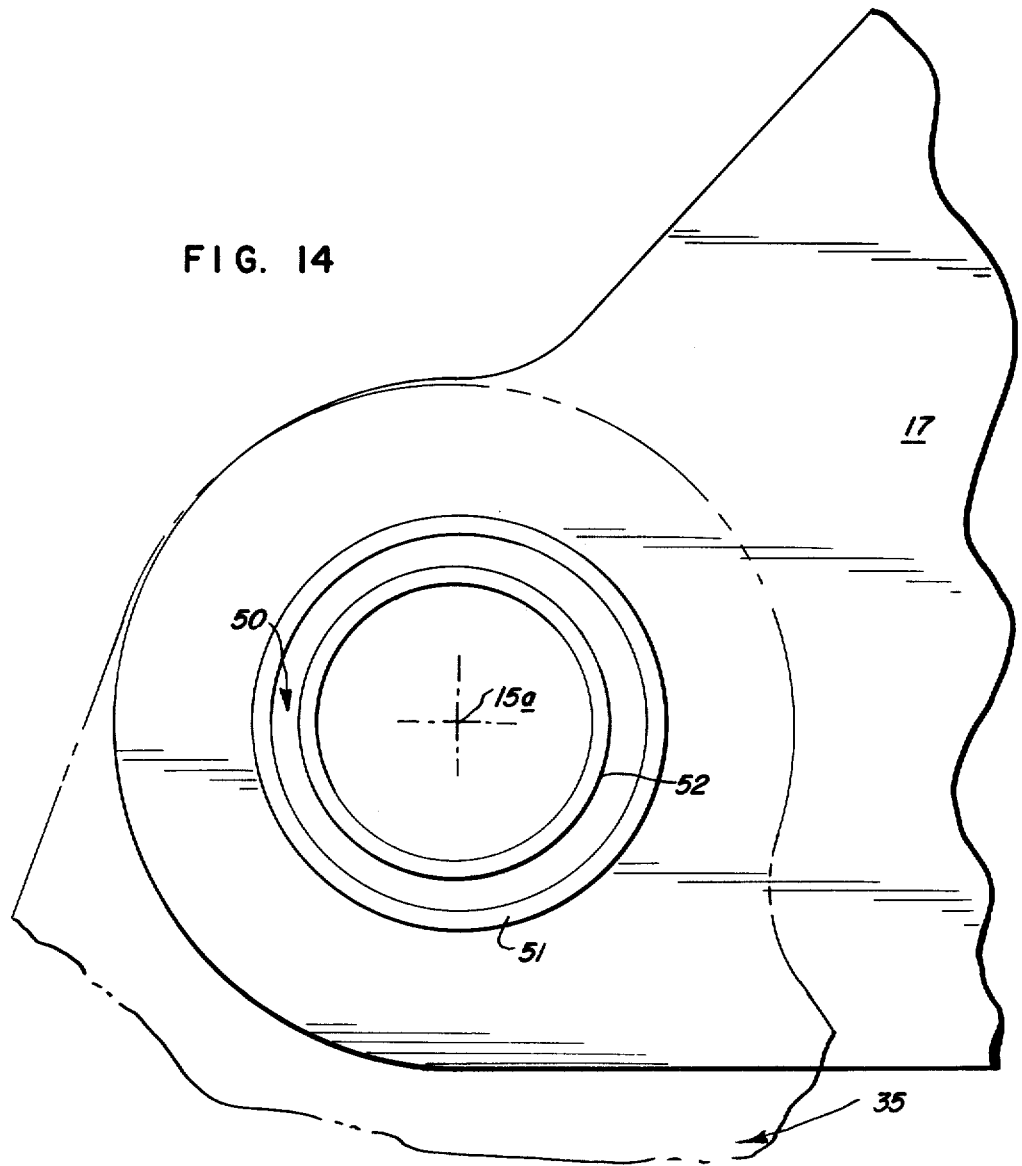
FIG. 14 is a partial perspective view of an optional pivot mounting for the pivot pins of the undercutter.

FIG. 14 shows a modification to the mounting for the undercutter pivots made to assist in the movement of the cutter 35 through the earth. To overcome friction between the surface of the cutter and the surrounding earth and to help the blade cut through the earth an orbital oscillation is applied to the cutter blade. FIG. 14 shows an eccentric bearing 50 mounting at the pivots for the undercutter 35 whereby axis 15a is rotated in a circular orbit such that an eighth of an inch radial movement is caused 500 times per minute at the cutter. The eccentric bearing 50 includes an outer bearing 51 and an inner bearing 52 such that axis 15a about which undercutter 35 pivots is completely bushed with respect to eccentric bearing 50. When eccentric bearing is rotated the axis 15a of undercutter 35 is caused to orbit in a circle imparting an orbital oscillatory motion to the cutter 35. The oscillation need not be large nor the frequency of such motion be great in order to overcome the static friction between the earth and cutter 35.

The operation of the excavation apparatus 10 can be described by considering the procedure of excavating a tree or rooted plant 11 from the earth in conjunction with the drawings, and the preceding description. It should be appreciated that the spades 19a and c are initially swung to their outwardly or open position about hinges 18 by cylinders 31a and c and that the spades 19 are in their uppermost position with respect to guides 22a, b and c. The apparatus 10 is brought into position about the rooted plant 11 such that the plant 11 is centered with respect to the spades 19, as shown in FIGS. 2 and 8. Once the apparatus 10 is so aligned the arms 12 are lowered by cylinders 13 such that support 15 comes to rest upon adjustable feet 40 which touch the ground. The adjusted position of feet 40 has a definite bearing upon the depth of the ball excavated. That is to say if the feet 40 are extended downwardly to the extent shown in FIG. 1, the resulting ball will not be as deep as if the feet are positioned as shown in FIGS. 2, 3 and 4. Once the apparatus 10 is properly lowered and positioned the control which supplies hydraulic fluid to cylinders 31a and c is opened for applying pressure through pivots 33a and c to arms 32a and c for pivoting ends 17a such that they are brought into alignment with legs 17 whereby spades 19a and c assume the positions illustrated in FIG. 3, surrounding the base of the rooted plant 11, but not completely enclosing same. As explained the spades 19a, b and c are mounted for reciprocal movement on guides 22a, b and c, and are slightly angled with respect to the top of U-shaped member 15 such that their bottom ends if extended would meet at a substantial distance below the center of the rooted plant 11 and this is important since the bottom of the ball should be as large as possible. Similarly, if the inward faces of guides 22a, b and c or plates 29a, b and c were extended into plane surfaces until they intersect with one another, an inverted three-sided pyramid would be generated. The foregoing is helpful in the understanding of the way in which the spades 19 converge about the roots of the plant 11 forming a generally frusto-conical hollow enclosure 25. The process of piercing the soil by spades 19 is accomplished in separate stages and each spade 19 is inserted and moved into the soil separately and independently, thus minimizing the amount of power required and the reaction forces incurred by the apparatus 10 during the piercing of the soil. The hydraulic fluid supply for cylinders 26a, b and c can be uniform, intermittent or oscilating to provide a smooth or a reasonanting jack hammer effect to pierce the earth. Similarly, the hydraulic fluid supply for the undercutter cylinders 36a and c can be used to vibrate and ram the cutter 35 through the earth. FIG. 3 shows spade 19c supported by spade support 21c for movement downwardly along guide 22c by means of cylinder 26c pivotally connected to support 21c at pivot 27c and to end 17a at 28c. Consequently, spade 19c may be inserted into the earth the full stroke of cylinder 26c, and similarly spade 19b is driven into the earth by cylinder 26b and 19a is forced into the earth by cylinder 26a. A generally frusto-conical enclosure 25 is formed by the inserted spades 19a, b and c, thus severing a ball of a frusto-conical shape from the surrounding soil. Consequently, the roots of plant 11 are surrounded by a unique ball package shaped for good transplantation. The taper of the ball being slight (8° to 10°) with earth surrounding the roots at the bottom as well as the top, thus saving more of the important root structure for replanting and early reestablishment.

Before the plant may be removed, it must be severed from the earth beneath the enclosed ball; for this purpose cutter 35 is provided, to be swung, as shown in FIG. 5 by hydraulic cylinders 36a and c, from its juxtaposed position downwardly and forwardly beneath enclosure 25. It will be noted that the bow or curve of blade 35c produces a generally hemispherical convex bottom for the ball which is important to its removal from the enclosure 25 and retention of the tap root. The blade radius is 28 inches.

To support the ball during removal from the surrounding earth the cutter 35 may be left immediately below the ball while the rooted plant 11, the enclosure 25 and the ball are lifted out of the earth by arms 12 and cylinders 13, supported on a rubber-tired vehicle, as Case Uniloader Model 1737.

Figure 10:
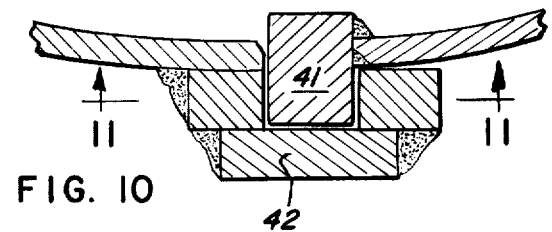
FIG. 10 is an enlarged partial sectional view of the locking members shown in FIG. 4, and taken substantially along lines 10—10.
Figure 11:
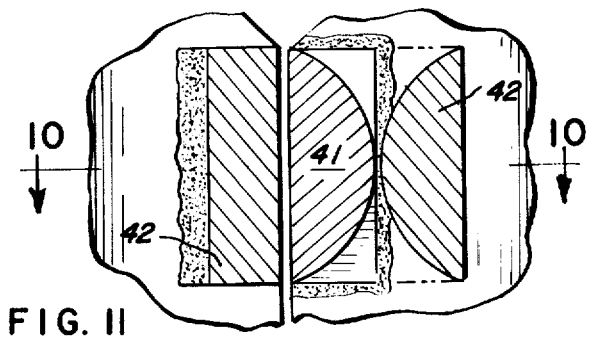
FIG. 11 is a partial sectional view of the locking members shown in FIG. 10 as viewed along lines 11—11 therein.

The edge of spade 19c includes an outwardly semicylindrical finger 41, see FIGS. 3, 10 and 11, which is shaped to cooperate with a C-shaped latch 42 located on the adjoining edge of spade 19a. Finger 41 is near the top of the spade portion of spade 19c where it abuts spade 19a when both spades are at their lowermost inserted position. C-shaped latch 42 is similarly located near the upper abutting edge spade 19a, therefore, when spade 19a is lowered into the ground spades 19a and 19c are brought into latching engagement, and latch 42 slides over finger 41 as shown in FIG. 10. This feature is particularly important during the lifting of the enclosure 25 with rooted plant 11 and the ball from the surrounding earth as the latch 42 helps hold the spades 19a and c together. FIG. 11 shows that portions of finger 41 and latch 42 are shaped to guide a cam finger 41 into the C-shaped recess of latch 42.

After movement of apparatus 10 to a convenient location, the cutter 35 is swung about axis 15a rearwardly and upwardly to its juxtaposed position, and then the enclosure 25, ball and rooted plant 11 are lowered such that the hemispherical bottom rests upon the ground causing the weight of the plant 11 to be slightly lifted from the enclosure 25. Spades 19a or c may then be shifted slightly with respect to each other releasing finger 41 from the C-shaped latch 42 without disturbing the ball. Ends 17a may be pivoted outwardly by cylinders 31a and c, thus forcing spades 19a and c to swing apart at their front edge and converge at their rear edge gently pushing the ball away from the spade 19b. The placement of hinges 18 along legs 17 is directly related to the amount of push given by rear edges of spades 19a and c; too much push will damage the ball whereas too little push will not assist in removal. As illustrated in FIG. 2, spades 19a and c part sufficiently to allow easy separation of the excavated rooted plant 11 and the apparatus 10.

Figure 12:
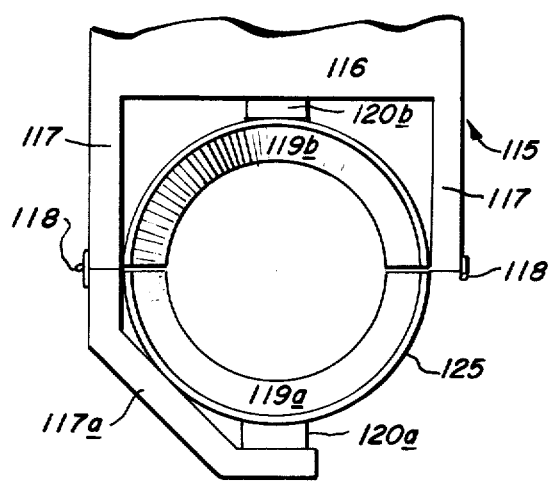
FIG. 12 is a schematic representation of another embodiment having two spades, one of which pivots to open the hollow frusto-conical enclosure.
Figure 13:
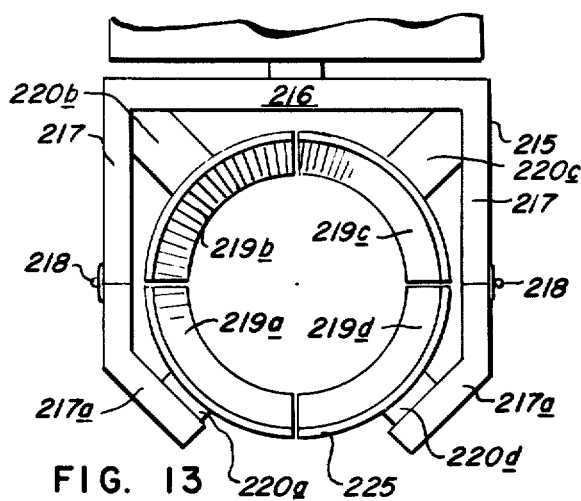
FIG. 13 is a schematic illustration of another arrangement including four spades which cooperate to form a hollow frusto-conical enclosure.

FIGS. 12 and 13 show schematic arrangements wherein either two or four spades may be employed to cooperate in forming a generally frusto-conical hollow enclosure for the pierced earth about the roots of a tree or shrub. It should be appreciated that the mechanisms previously described will function as well with any number of spades and the use of either two, three or four spades is related to the ball size and power required.

Briefly, FIG. 12 shows a generally U-shaped structure 115 for supporting a pair of spades 119a and b on guide mechanisms 120a and b which are identical in operation and construction to the mechanisms 20 already described. U-shaped support 115 includes a bight portion 116 and a pair of outer legs 117 either one of which may support a pivoted or hinged extended arm 117a at pivot 118. Arm 117a is arranged to swing in a horizontal plane outwardly with respect to support 115 and has mounted thereon at the end thereof a mechanism 120a for supporting a spade 119a. Spade 119b is similarly mounted on a mechanism 120b attached to the bight portion 116 of U-shaped support 115 such that spades 119a and b cooperate to form a two piece hollow frusto-conical enclosure 125.

Spades 119a and b may include a locking device similar to that shown in FIG. 11 at 41 and 42 but located at the point where the adjoining spades part to open the enclosure.

FIG. 13 shows a generally U-shaped support 215 for carrying four spades 219a, b, c and d, each retained for reciprocal movement on a mechanism 220a, b, c and d, respectively, in the manner and mode already explained in connection with the three spade embodiment. U-shaped support 215 includes a bight portion 216 and a pair of horizontally extending legs 217 each of which supports a hinged end 217a at pivots 218. Ends 217a are arranged to swing in a horizontal plane outwardly or away from support 215 and are provided with spade mechanisms 220a and d such that the hollow frusto-conical enclosure 225 formed by spades 219a, b, c and d can be opened to permit removal of the excavated plant. At the junctures of bight 216 and legs 217 are additional mechanisms 220b and c which move spades 219b and c.

Spades 219a and d may include a locking device similar to that shown in FIG. 11 at 41 and 42 but located at the point where the adjoining spaces part to open the enclosure.

The alternate embodiments shown in FIGS. 12 and 13 are arranged to operate with the rest of the apparatus 10 explained in this specification. The details of the hydraulic cylinders explained in connection with the three spade embodiment are for the most part identical as are the undercutting and locking components.

As explained the number of spades, the size of spades, and their location may be varied from those described and illustrated as long as a generally frusto-conical enclosure is formed without departing from the scope of the invention. It is to be understood that the present disclosure has been made only by way of example and that many additional modifications and changes in various details may be applied to achieve the invention. Thus, it will be seen that a simple, sturdy, reliable, efficient and economical excavation apparatus has been provided wherein the rooted plant is removed with an associated ball having a shape to protect the roots during transplantation.

What is claimed is:

1. An apparatus comprising: a U-shaped support attached to a vehicle for vertical movement relative to the earth including a bight connecting a pair of horizontally extending legs, each of said legs being hinged at a point between said bight and its end for horizontal arcuate motion of said ends; a plurality of spades, each defining a frusto-conical segment, and means mounting each of said spades to said U-shaped support spaced from and surrounding a vertical central digging axis, each of said spades being mounted for independent receiprocal movement of said spades in a generally downward direction convergent toward said axis and upward divergent from said axis; power means connected to each of said hinged legs for pivoting said ends from a first position in line with said legs to a second position pointed away from each other; whereby a generally frusto-conical tapering hollow enclosure having a slightly larger opening at the top than the bottom and being open at both ends is formed by said spades when said ends are in said first position and said spades are moved to the bottom of their vertical travel, said enclosure opening along the side nearest the mouth of said U-shaped support when said ends are in said second position and said U-shaped support is moved to the top of its vertical travel; a severing member including a pair of arms, each having one end pivotally connected to one side of said U-shaped support and a blade connected between the opposite ends of said arms for swinging movement about a horizontal axis and beneath the lower opening of said enclosure, and the central portion of said blade being bowed outwardly with respect to said horizontal axis, whereby a frusto-conical tapering ball of earth with a convex bottom may be severed from the earth by the apparatus.

2. The apparatus of claim 1 wherein said power means includes a pair of hydraulic cylinders mounted generally parallel and above said horizontally extending legs connected to each of said hinged legs for pivoting said ends and for movement of said ends from said first position to said second position control means associated with the hydraulic supply for said hydraulic power cylinders such that said ends may be moved in unison.

3. The apparatus of claim 1 wherein said means mounting each of said spades includes a plurality of channels supported in substantially vertical positions extending upwardly and outwardly from said U-shaped support, each said channel portion facing away from said U-shaped support, a plurality of power cylinder means nestled within the open side of said channels and attached thereto at their lower end and connected to spade supports at their upper ends, said spade supports shaped to fit, slide upon, and be guided by the inward faces of said channels for movement along said channels, said spade support connecting between the movable end of said power cylinder and the upper end of said spades, connecting means associated with said spades and said spade supports to facilitate changing, replacement and repair of said spades.

4. The apparatus of claim 3 wherein said connecting means includes two rows of eyes located on the support sides of said spades and disposed in two lines aligning said eyes, cooperating rows of eyes with aligned openings connected to said spade support and positioned in a similar spaced relationship whereby said eyes of said spade and said eyes of said spade support conjugate, and L-shaped rods having elongated sides to be used for filling the aligned conjugated eye openings.

5. The apparatus of claim 3 wherein hydraulic fluid pressure control means are provided in a line supplying fluid to said spade hydraulic cylinders for periodically changing the flow and pressure of the hydraulic fluid therein to create a jack-hammer effect upon the movement of said spade.

6. The apparatus of claim 3 wherein said spades are formed of a latitudinally curved piece of metal developed from a flat sheet in the shape of an oppositely truncated diamond, said diamond disposed with its larger truncated base at the bottom such that when in said first position being inclined at an angle for abutting adjacent spades forming an element of said enclosure when said spade is at the bottom of its travel along said channels.

7. The apparatus of claim 6 wherein the abutting edges of at least one pair of said spades include slidable locking means having an outwardly extending C-shaped latch for cooperating with a protruding finger on another of said spades such that when the spades are juxtaposed for forming an enclosure said latch surrounds and retains said finger assuring the abutment of said adjacent spades.

8. The apparatus of claim 6 wherein said channels are angled at 8° to 10° with respect to the vertical such that said blades converge to form a slightly tapered generally frusto-conical enclosure.

9. The apparatus of claim 1 wherein said blade is swung arcuately by hydraulic means connected between said arms and said U-shaped support.

10. The apparatus of claim 9 wherein hydraulic fluid pressure control means are provided in a line supplying fluid to said severing member hydraulic means for periodically changing the flow and pressure of the hydraulic fluid therein to create a jack-hammer effect upon the movement of said severing member.

11. A method of excavating a rooted plant with a trunk that is transverse to the earth surface consisting of the following steps: centering the rooted plant within an apparatus having a plurality of earth piercing spades disposed at a slight angle with respect to the trunk such that movement of said spades into the earth tends to bring them into contact with one another for forming an inwardly tapering hollow frusto-conical enclosure open at both ends; driving one of said spades into the earth and thereby piercing the earth to a depth sufficient to sever a portion of the earth about the plant roots; driving additional spades into the earth for forming a hollow generally frusto-conical enclosure about the roots; swinging a stirrupshaped cutter beneath the lower open end of said enclosure for severing the bottom of said rooted plant beneath said enclosure and for generating a generally downwardly convex surface thereat; lifting said enclosure, said cutter and the rooted plant out of the ground; and moving said enclosure and said cutter to a convenient place; swinging said cutter away from the convex surface; lowering said spades relative to the severed earth and rooted plant to rest the convex surface on the earth surface and separate the severed earth from said spades.

12. An apparatus for excavating a section of earth comprising a member disposed in a horizontal plane connected to a vehicle by means of a pair of links such that said member may be raised and lowered, a plurality of spade-like tools which may be brought to abut one another along adjacent vertical edges supported upon said horizontal member by means of a plurality of slides and associated means for independently moving said tools into the earth for forming a conic sleeve tapering inwardly toward the bottom, said slides and means are angled with respect to said member so that their bottom ends if extended would meet at a substantial distance, hinge means on said member for pivotal movement about a vertical axis of at least one of said spade-like tools with respect to said member, locking means on said tools for slidably connecting said abutting edges of at least two of said tools, a swing shaped cutting blade pivotally supported on said member swingable therefrom to a position past the bottom of said sleeve, said blade bowed away from said sleeve for severing a generally hemispherical convex bottom on the section of earth.

13. The apparatus of claim 12 wherein the pivotal support for said swing shaped cutting blade revolves in a circular orbit whereby an oscillating orbital motion is imparted to said cutting blade.

* * * * *